(12) United States Patent
Tazerout (10) Patent No.: US 9,011,159 B2
(45) Date of Patent: Apr. 21, 2015

(54) TRIDIMENSIONAL MODELING APPARATUSES, SYSTEM AND KIT FOR PROVIDING A REPRESENTATION OF AN EXPLORATION NETWORK

(71) Applicant: Abdelhakim Tazerout, Laval (CA)

(72) Inventor: Abdelhakim Tazerout, Laval (CA)

(*) Notice: Subject to any disclaimer, the term of this patent is extended or adjusted under 35 U.S.C. 154(b) by 0 days.

(21) Appl. No.: 14/351,466

(22) PCT Filed: Nov. 12, 2013

(86) PCT No.: PCT/CA2013/050861
§ 371 (c)(1),
(2) Date: Apr. 11, 2014

(87) PCT Pub. No.: WO2014/071529
PCT Pub. Date: May 15, 2014

(65) Prior Publication Data
US 2014/0349268 A1   Nov. 27, 2014

(30) Foreign Application Priority Data
Nov. 12, 2012  (GB) .................................. 1220363.4

(51) Int. Cl.
G09B 23/00    (2006.01)
G09B 23/40    (2006.01)
G09B 25/06    (2006.01)
E21B 47/00    (2012.01)

(52) U.S. Cl.
CPC ................. *G09B 23/00* (2013.01); *E21B 47/00* (2013.01); *G09B 23/40* (2013.01); *G09B 25/06* (2013.01)

(58) Field of Classification Search
USPC .................................. 434/107, 276
See application file for complete search history.

(56) References Cited

U.S. PATENT DOCUMENTS 1,425,705 A    8/1922  Sheppard
3,571,948 A *  3/1971  Heffernan ..................... 434/107

FOREIGN PATENT DOCUMENTS

DE    1 130 626 B    5/1962
FR    2 706 213 A1   12/1994

OTHER PUBLICATIONS

International Search Report for corresponding International Patent Application No. PCT/CA2013/050861 mailed Jan. 30, 2014.

* cited by examiner

*Primary Examiner* — Xuan Thai
*Assistant Examiner* — James Hull
(74) *Attorney, Agent, or Firm* — Merchant & Gould P.C.

(57) ABSTRACT

A tridimensional modeling apparatus, system and kit is for representing an exploration network. The apparatus, system and kit include a transparent hollow cube with six plane surfaces for representing an enclosed volume, a plurality of perforations on at least two of the six plane surfaces and indicia around each opening for marking polar coordinates and orientation. The apparatus, system and kit further include a plurality of transparent rods for representing exploration channels. The plurality of perforations on the cube are arranged for receiving rods for tridimensional modeling of the exploration network and each rod is inserted into an opening with an angle and a depth, thereby resulting in a visual representation of the exploration network within the represented volume.

21 Claims, 11 Drawing Sheets

TRIDIMENSIONAL MODELING APPARATUSES, SYSTEM AND KIT FOR PROVIDING A REPRESENTATION OF AN EXPLORATION NETWORK

This application is a National Stage Application of PCT/CA2013/050861, filed 12 Nov. 2013, which claims benefit of Ser. No. 12/203,634, filed 12 Nov. 2012 in Great Britain and which applications are incorporated herein by reference. To the extent appropriate, a claim of priority is made to each of the above disclosed applications.

FIELD OF THE INVENTION

The present invention generally relates to tridimensional modeling apparatuses. More particularly, the present invention relates to tridimensional modeling apparatuses, a system and a kit for providing a representation of an exploration network.

BACKGROUND OF THE INVENTION

This section is intended to introduce several aspects of the art, which may be related with exemplary embodiments of the present invention. This discussion is believed to assist in providing a context to enable a better understanding of particular aspects of the present invention. In view of that, it should be understood that this section should be read in this light, and not necessarily as admissions of prior art.

Scientists are often tasked with field exploration for the purpose of discovering information and potential resources. Field exploration is at times conducted in remote areas and may be considered a relatively expensive and high-risk endeavour with typically no guarantees of finding information or commercially viable resources.

Scientists are at times also tasked with creating visual representations of their discoveries for the purpose of communicating information to others or for the purpose of aiding with the evaluation of commercial opportunities. In other situations, the visual representations of their discoveries serve educational purposes.

For instance, geologists or geoscientists are often tasked with subsurface exploration. These experts, who study the science of the solid Earth and the processes by which the solid Earth is shaped and changed, are regularly given mandates of generating targets within a predetermined subsurface volume. Geologists involved in subsurface exploration often use geological modeling to define the geometry and location of deposits.

Geological modeling usually includes representing subsurface volumes of the Earth based on observations made by a geologist. Common techniques involve dividing the subsurface volume into a grid and defining or predicting geological properties within the grid. In general, the methods and systems available for tridimensional geological modeling require the use of a computer and the appropriate software, which can be quite expensive, non-intuitive and requiring constant software updates.

As a result, geologists are regularly confronted with several inconveniences that are at times even disabling to their work. These inconveniences primarily relate to geographical isolation, namely limited access to technical training and limited access to necessary tools and technologies.

In the context of educational training, the practical study of geology involves doing a lot of drilling into the ground and, as such, a great deal of training involves learning about drilling orientations and angles. It is thus expected of a trained geologist to understand exactly where a drilled wellbore ends up underground, which is often quite difficult for some to visualize. Additionally, in circumstances where it is not possible for students to experience field exploration during their education, tangible visualization tools for providing a visual and physical representation of subsurface volumes are not readily available.

The above-described examples also portray a similar situation experienced by students and scientist in other scientific disciplines, but not limited to, various natural sciences including Earth sciences, glaciology, oceanology, limnology, climatology, or space sciences.

Thus, there is still a need for inexpensive and intuitive tridimensional modeling tools that provide physical representations of an exploration network.

SUMMARY OF THE INVENTION

The present invention responds to the above-mentioned need by providing a tridimensional modeling apparatus, a system and a kit for providing a representation of an exploration network.

In one aspect of the present invention, there is provided a tridimensional modeling apparatus for providing a representation of an exploration network. The modeling apparatus includes:

a transparent hollow cube includes:

six plane surfaces for representing an enclosed volume;

a plurality of perforations on at least two of the six plane surfaces; and         indicia around each opening for marking polar coordinates and orientation;

a plurality of transparent rods for representing exploration channels and each rod having a length of at least that of the diagonal of the plane surface; and     in which the plurality of perforations are equidistant and are aligned parallel to each other for angularly receiving the plurality of rods for tridimensional modeling of the exploration network; and     in which each rod is inserted into an opening with an angle and a depth corresponding to an angle and a depth of the exploration channels, the resulting apparatus with the inserted rods providing a visual representation of the exploration network within the represented volume.

According to an optional aspect of the tridimensional modeling apparatus, the surfaces and the rods are of a thermoplastic material.

Preferably, the thermoplastic material includes polymethyl methacrylate.

According to another optional aspect of the tridimensional modeling apparatus, the perforations are of a circular shape.

According to another optional aspect of the tridimensional modeling apparatus, the rods are cylindrical.

Preferably, the rods are flexible.

According to another optional aspect of the tridimensional modeling apparatus, each rod is capable of being colored with a marker for drawing patterns on the rod for representation of various strata of observation channels.

Preferably, the marker is erasable.

According to another optional aspect of the tridimensional modeling apparatus, the surfaces are demountable.

Preferably, the apparatus further includes corner fasteners for mounting and demounting of the cube and for connecting a plurality of tridimensional modeling apparatuses together.

According to another optional aspect of the tridimensional modeling apparatus, the indicia are markings with divisions or units of measurement.

In some embodiments, the markings or units of measurement are successively arranged in degrees.

In another aspect of the present invention, there is provided a tridimensional modeling apparatus for providing a representation of a subsurface exploration network. The apparatus includes:
- a transparent hollow cube includes:
  - six plane surfaces for representing an enclosed subsurface volume;
  - a plurality of perforations on at least two of the six plane surfaces; and
  - indicia around each opening for marking polar coordinates and orientation;
- a plurality of transparent rods for representing subsurface exploration wells and each rod having a length of at least that of the diagonal of the plane surface; and
- in which the plurality of perforations are equidistant and are aligned parallel to each other for angularly receiving the plurality of rods for tridimensional modeling of the subsurface exploration network; and
- in which each rod is inserted into an opening with an angle and a depth corresponding to an angle and a depth of the subsurface exploration wells, the resulting apparatus with the inserted rods providing a visual representation of subsurface exploration network within the represented subsurface volume.

According to another optional aspect of the tridimensional modeling apparatus, the surfaces and the rods are of a thermoplastic material.

Preferably, the thermoplastic material comprises polymethyl methacrylate.

According to another optional aspect of the tridimensional modeling apparatus, the perforations are of a circular shape.

According to another optional aspect of the tridimensional modeling apparatus, the rods are cylindrical.

Preferably, the rods are flexible.

According to another optional aspect of the tridimensional modeling apparatus, each rod is capable of being colored with a marker for drawing patterns on the rod for a visual representation of various strata of the subsurface exploration wells.

In some embodiments, the various strata represent subsurface deposit layers or lithology.

Preferably, the marker is erasable.

According to another optional aspect of the tridimensional modeling apparatus, the surfaces are demountable.

According to another optional aspect of the tridimensional modeling apparatus, the modeling apparatus for providing a representation of a subsurface exploration network further includes corner fasteners for mounting and demounting of the cube and for connecting a plurality of tridimensional modeling apparatuses together.

According to another optional aspect of the tridimensional modeling apparatus, the indicia are markings with divisions or units of measurement.

In some embodiments, the markings or units of measurement are successively arranged in degrees.

In another aspect of the present invention, there is provided a system for bidimensional extrapolation of an exploration network. The system includes:
- a tridimensional modeling apparatus for representing an exploration network, the modeling apparatus includes:
  - a transparent hollow cube includes:
    - six plane surfaces for representing an enclosed volume;
    - a plurality of perforations on at least two of the six plane surfaces;
    - indicia around each opening for marking polar coordinates and orientation;
  - a plurality of transparent rods for representing exploration channels and having a length of at least that of the diagonal of the plane surface;
  - in which the plurality of perforations are equidistant and are aligned parallel to each other;
  - in which each rod is colored with a marker for a visual representation of various strata of observation channels; and
  - in which each rod is inserted into an opening with an angle and a depth corresponding to an angle and a depth of the exploration channels, the resulting apparatus with the inserted rods providing a visual representation of the exploration network within the represented volume; and further includes
- a light source directed at an angle onto the tridimensional modeling apparatus for projecting onto an opaque surface a bidimensional extrapolation of the exploration network.

In some embodiments, the observation channels represent subsurface exploration wells.

In some embodiments, the various Strata of observation channels represent subsurface deposit layers or lithology.

In another aspect of the present invention, there is provided a tridimensional modeling kit for representing an exploration network. The kit includes:
- a plurality of surfaces for assembling a transparent hollow cube for representing an enclosed volume, the surfaces include:
  - a plurality of perforations on at least two of the plane surfaces;
  - indicia around each opening for marking polar coordinates and orientation;
- a plurality of transparent rods for representing exploration channels and each rod having a length of at least that of the diagonal of the plane surface; and
- instructions for assembling the cube and for creating a tridimensional model of the exploration network.

According to another optional aspect of the kit, the kit further includes a marker for drawing patterns on the rods for representing various strata of observations channels.

According to another optional aspect of the kit, the kit further includes a rod marking tray for supporting and facilitating the marking of the rods.

Preferably, the kit further includes a carrycase for transporting and protecting the plane mountable surfaces and the plurality of rods.

Preferably, the kit further includes a docking station for immobilizing the tridimensional model of the exploration network.

Preferably, the kit further includes corner fasteners for mounting and demounting of the cube.

BRIEF DESCRIPTION OF THE DRAWINGS

These and other objects and advantages of the invention will become apparent upon reading the detailed description and upon referring to the drawings in which.

While the invention will be described in conjunction with an example embodiment, it will be understood that it is not intended to limit the scope of the invention to such embodiment. On the contrary, it is intended to cover all alternatives, modifications and equivalents as may be included as defined by the appended claims.

DETAILED DESCRIPTION OF PREFERRED EMBODIMENT

The present invention is directed to tridimensional modeling apparatus for providing a representation of an exploration network. The present invention is further directed to apparatuses, a system and a kit that include a transparent hollow cube with six plane surfaces for representing an enclosed volume, a plurality of perforations on at least two of the six plane surfaces and indicia around each opening for marking polar coordinates and orientation.

It is worth mentioning that throughout the following description, when the article "a" is used to introduce an element, it does not have the meaning of "only one" it rather means of "one or more". For instance, the tridimensional modeling of an exploration network including a transparent hollow cube according to the present invention may be provided with one or more transparent cubes, for modeling of one or more exploration networks, etc. without departing from the scope of the present invention.

Certain terms used in this application and their meanings as used in this context are set forth at the outset for ease of reference. To the extent a term used herein is not defined below, it should be given the broadest definition persons in the pertinent art have given that term as reflected in at least one printed publication or issued patent. Further, the present invention is not limited by the usage of the terms shown below, as all equivalents, synonyms, new developments, and terms or techniques that serve the same or a similar purpose are considered to be within the scope of the present invention.

As used herein, the expression "tridimensional modeling" or "tridimensional model" relates to a tridimensional visual replica.

As used herein, the term "exploration" generally relates to the act of searching with the intent of finding information or resources. Exploration may occur in various scientific disciplines such as, but not limited to, geology, mineralogy, petrology, geochemistry, geomorphology, paleontology, stratigraphy, structural geology, engineering geology, sedimentology, physical geography, geophysics, hydrology, oceanography, glaciology, space sciences or atmospheric sciences.

As used herein, the expression "exploration network" generally relates to an exploration arrangement or a complex exploration grid or system.

As used herein, the expression "exploration channels" generally relates to an exploration conduit, route or tubular path.

As used herein, the expression "diagonal of the plane surface" refers to any line that go from one corner of the plane surface, through the center of the surface, and ends at the opposite corner.

As used herein, the term "indicia" generally relates to markings or indications and may represent various parameters.

As used herein, the term "material" generally relates to a matter or substance that occupies space.

As used herein, the expression "thermoplastic material" generally relates to a polymeric material that may include, but not limited to, polycarbonate, polymethylpentene, polymethyl methacrylate, styrene acrylonitrile or acrylonitrile styrene acrylate.

As used herein, the term "flexible" generally relates to a capability of being bent, flexed or pliable.

As used herein, the term "strata" generally relates to multiple layers of material, naturally or artificially formed one upon another.

As used herein, the expression "units of measurement" generally relate to a definite magnitude of a physical quantity.

As used herein, the term "subsurface" generally relates to an area beneath the surface of the Earth or of a body of water.

As used herein, the expression "subsurface exploration" generally relates to "hydrocarbon exploration" or "mineral exploration" which indicates the act of searching with the purpose of finding hydrocarbons or minerals. Hydrocarbon or mineral exploration methods may vary depending on the different stages of the process, the size of the area being explored, as well as the quantity and type of information sought. A "hydrocarbon" generally relates to an organic compound having carbon and hydrogen. A "mineral" generally relates to a naturally occurring substance that is stable at room temperature, can be represented by a chemical formula, is usually abiogenic, and has an ordered atomic structure.

As used herein, the expression "exploration well" generally relates to a deep hole or shaft sunk into the subsurface.

As used herein, the term "lithology" generally relates to the description of physical characteristics, such as colour, texture, grain size, or composition of a rock unit.

As used herein, the term "extrapolation" generally relates to estimation by extension or projection of known information.

In the following description, similar features in the drawings have been given similar reference numerals and in order to weight down the figures, some elements are not referred to in some figures if they were already identified in a precedent figure.

Figure 1A:
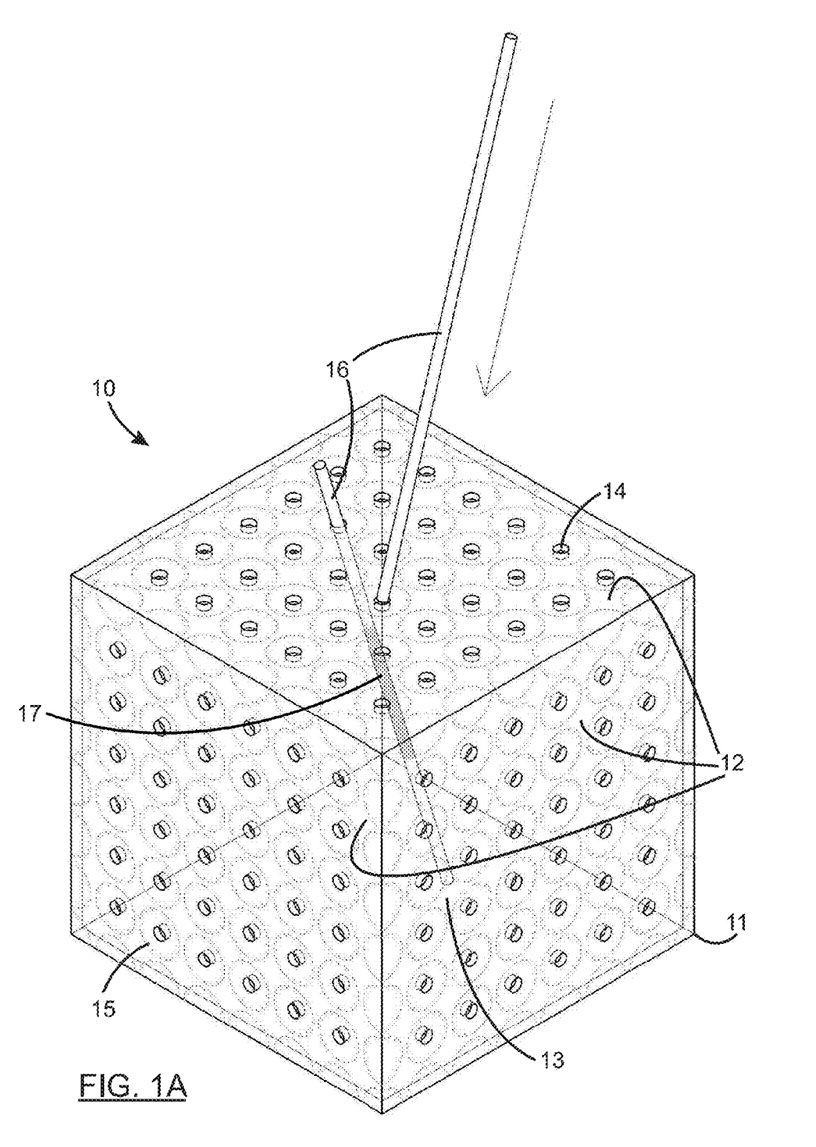
FIG. 1A is a perspective view of the tridimensional apparatus with inserted rods according to an embodiment of the present invention.
Figure 1B:
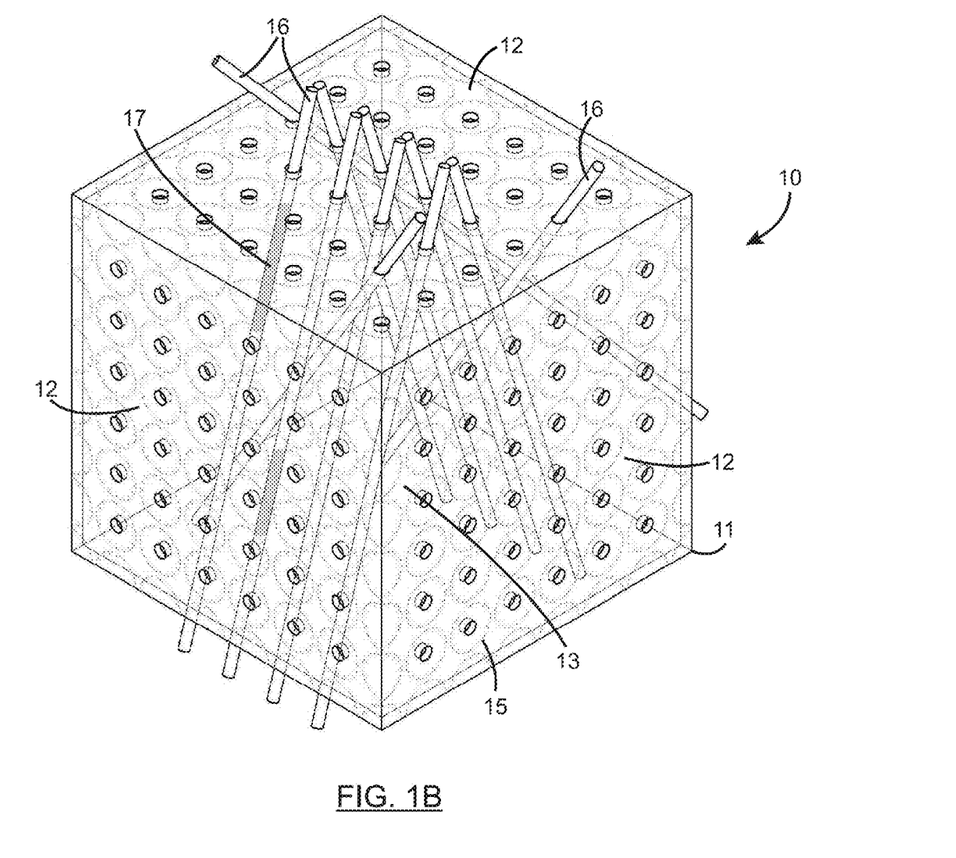
FIG. 1B is another perspective view of the tridimensional apparatus with inserted rods according to an embodiment of the present invention.

Referring to FIGS. 1A and 1B, a tridimensional modeling apparatus (10) is shown for providing a representation of an exploration network that includes a transparent hollow cube (11). The cube (11) includes six plane surfaces (12) for representing an enclosed volume (13). The cube (11) also includes a plurality of perforations (14) on at least two of the six plane surfaces (12) and indicia (15) around each opening for marking polar coordinates and orientation. The tridimensional modeling apparatus (10) also includes a plurality of transparent rods (16) for representing exploration channels and each rod (16) having a length of at least that of the diagonal of the plane surface (11). The perforations (14) are equidistant and are aligned parallel to each other for angularly receiving the plurality of rods (16) for tridimensional modeling of the exploration network. Each rod is inserted into an opening (14) with an angle and a depth corresponding to an angle and a depth of the exploration channel, the resulting apparatus (10) with the inserted rods (16) providing a visual representation of the exploration network within the represented volume.

By being transparent, the cube (11) and the rods (16) enable the observation of the modeled exploration network.

Although it is not shown in the figures, the surfaces (12) and the rods (16) may be of a thermoplastic material, for its ability to withstand various environmental conditions in which the scientist may find themself. In general, thermoplastics are known to have a good range of properties, making them lightweight, high strength, and energy efficient when manufactured.

Preferably, the thermoplastic material includes polymethyl methacrylate, better known as Plexiglas® for its lightweight and shatter-resistance.

According to another optional aspect of the tridimensional modeling apparatus (10), the perforations (14) may be of a circular shape and large enough to allow for the insertion rods (16) at various angles.

According to another optional aspect of the tridimensional modeling apparatus (10), the rods (16) may be cylindrical.

According to another optional aspect of the tridimensional modeling apparatus (10), the rods (16) may be flexible.

According to another optional aspect of the tridimensional modeling apparatus (10), each rod (16) is capable of being colored (17) with a marker for drawing patterns on the rod for representation of various strata of observation channels.

Although it is not shown in the figures, the marker is erasable in some embodiments.

Figure 2A:
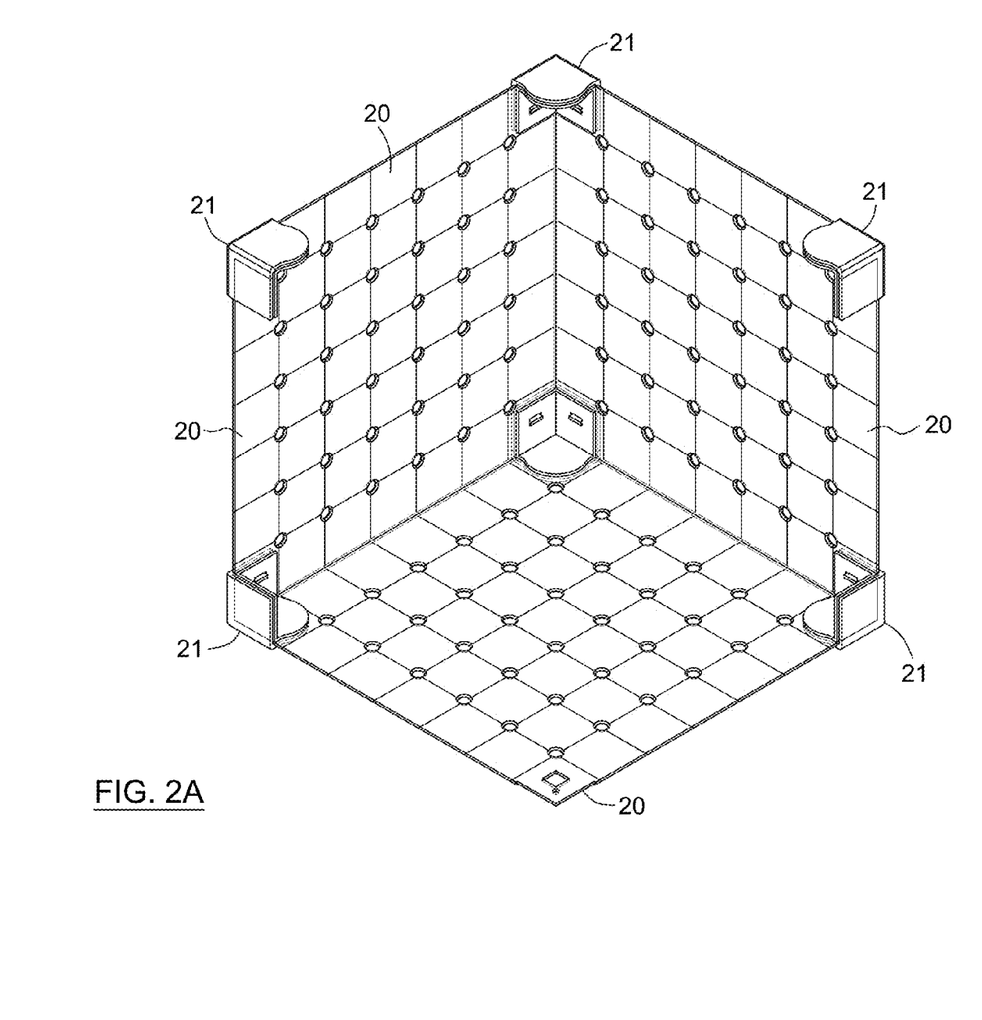
FIG. 2A is a perspective view of an open tridimensional apparatus during assembly.
Figure 2B:
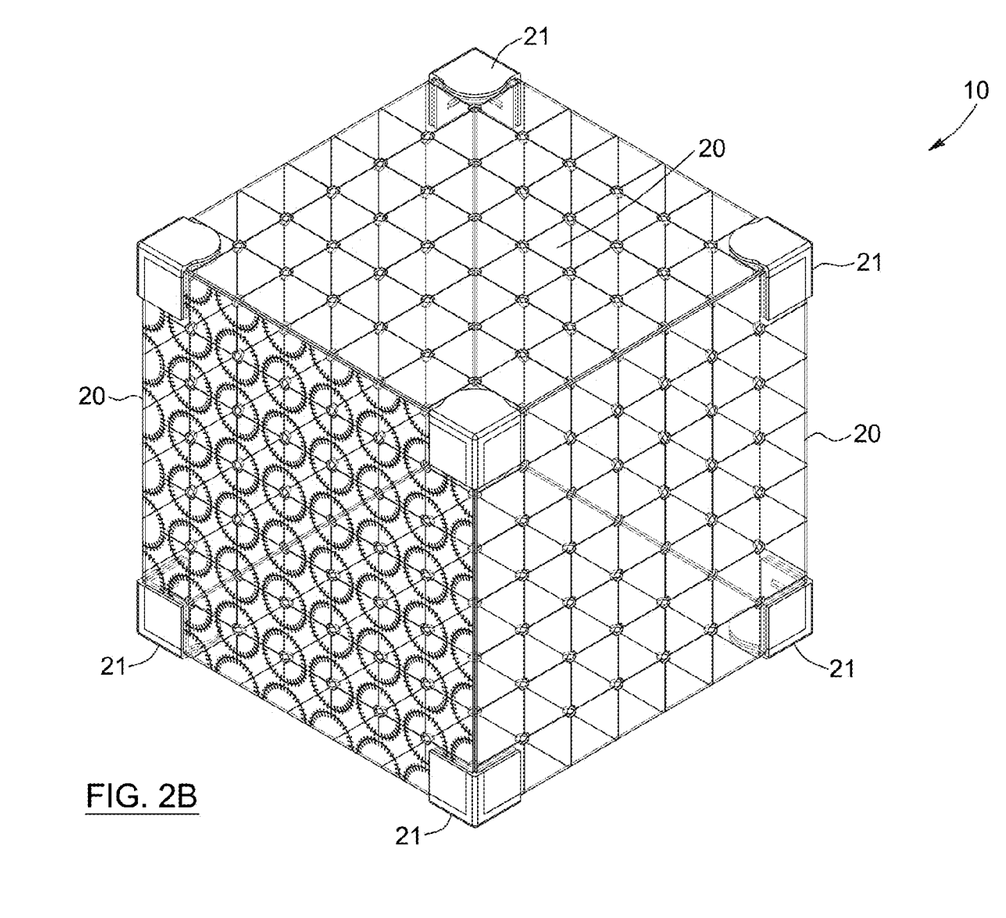
FIG. 2B is a perspective view of the tridimensional apparatus according to an embodiment of the present invention.
Figure 2C:
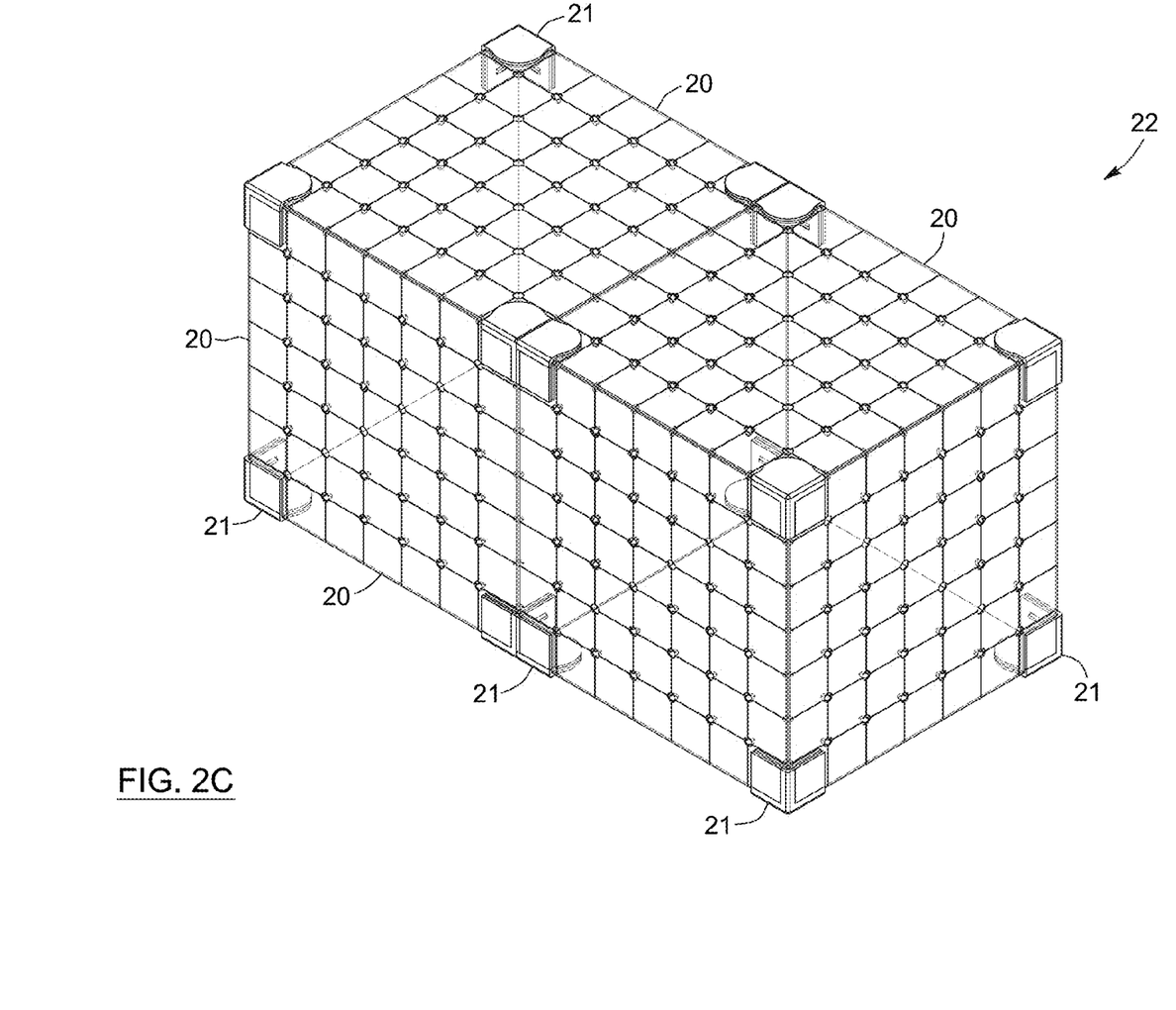
FIG. 2C is a perspective view of a plurality of tridimensional modeling apparatuses according to an embodiment of the present invention.

Referring to FIGS. 2A, 2B and 2C, the surfaces may be demountable (20) according to another optional aspect of the tridimensional modeling apparatus (10).

According to another optional aspect of the tridimensional modeling apparatus (10), the apparatus (10) may further include corner fasteners (21) for mounting and demounting of the cube (11) and for connecting a plurality of tridimensional modeling apparatuses (22) together.

Figure 3:
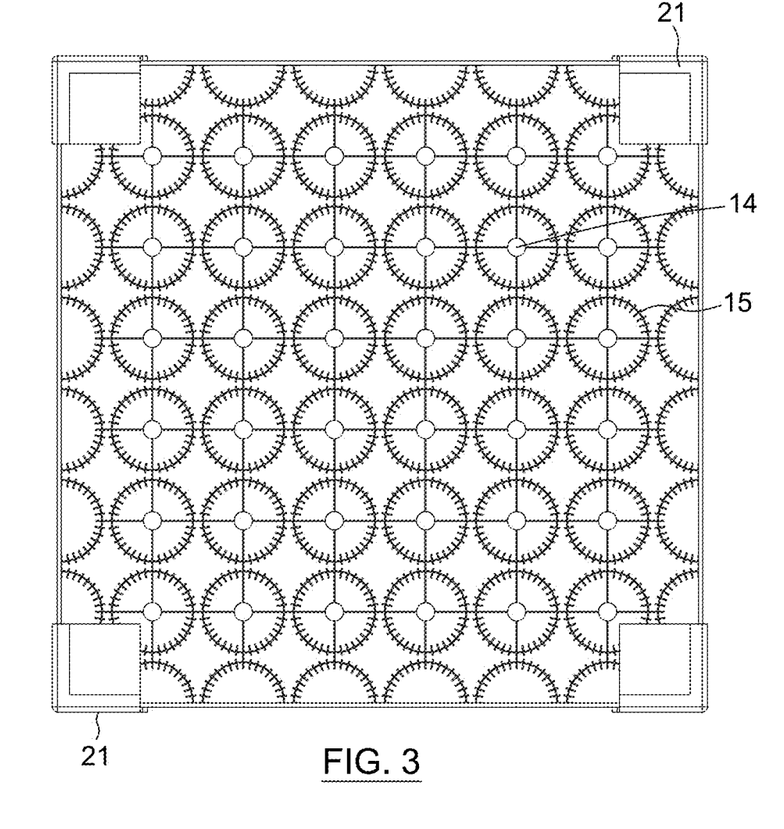
FIG. 3 is a side view of the tridimensional apparatus according to an embodiment of the present invention.

Referring to FIG. 3, indicia (15) may be markings with divisions or units of measurement. In an academic context the indicia (15) around each opening (14) may be used by students to obtain polar coordinates and orientation, as would occur in the field.

In some embodiments, the markings or units of measurement may be successively arranged in degrees.

Referring again to FIGS. 1A and 1B, in another aspect of the present invention, a tridimensional modeling apparatus (10) is shown for providing a representation of a subsurface exploration network that includes a transparent hollow cube (11). The cube (11) includes six plane surfaces (12) for representing an enclosed subsurface volume (13). The cube (11) also includes a plurality of perforations (14) on at least two of the six plane surfaces (12) and indicia (15) around each opening for marking polar coordinates and orientation. The tridimensional modeling apparatus (10) also includes a plurality of transparent rods (16) for representing subsurface exploration wells and each rod (16) having a length of at least that of the diagonal of the plane surface (11). The perforations (14) are equidistant and are aligned parallel to each other for angularly receiving the plurality of rods (16) for tridimensional modeling of the subsurface exploration network. Each rod is inserted into an opening (14) with an angle and a depth corresponding to an angle and a depth of the subsurface exploration wells, the resulting apparatus (10) with the inserted rods (16) providing a visual representation of the subsurface exploration network within the represented subsurface volume (13).

Although it is not shown in the figures, the surfaces (12) and the rods (16) may be of a thermoplastic material for its ability to withstand various environmental conditions in which the scientist may find themself. In general, thermoplastics are known to have a good range of properties, making them lightweight, high strength, and energy efficient when manufactured. The thermoplastic material may be polycarbonate, polymethylpentene, polymethyl methacrylate, styrene acrylonitrile or acrylonitrile styrene acrylate, for instance. Preferably, the thermoplastic material includes polymethyl methacrylate, better known as Plexiglas® for its lightweight and shatter-resistance.

According to another optional aspect of the tridimensional modeling apparatus (10), the perforations (14) may be of a circular shape and large enough to allow for the insertion rods (16) at various angles.

According to another optional aspect of the tridimensional modeling apparatus (10), the rods (16) may be cylindrical.

According to another optional aspect of the tridimensional modeling apparatus (10), the rods (16) may be flexible.

According to another optional aspect of the tridimensional modeling apparatus (10), each rod (16) is capable of being colored (17) with a marker for drawing patterns on the rod for representation of various strata of the subsurface exploration wells.

In some embodiments, the various strata may represent subsurface deposit layers or lithology that one can find during exploration.

Although it is not shown in the figures, the marker is erasable in some embodiments.

Referring again to FIGS. 2A, 2B and 2C, there is shown surfaces that are demountable (20), according to another optional aspect of the tridimensional modeling apparatus (10).

According to another optional aspect of the tridimensional modeling apparatus (10), the apparatus (10) further includes corner fasteners (21) for mounting and demounting of the cube (11) and for connecting a plurality of tridimensional modeling apparatuses (22) together.

Referring to FIG. 3, indicia (15) may be markings with divisions or units of measurement. In an academic context the indicia (15) around each opening (14) can be used by students to get their polar coordinates and orientation, as would occur in the field.

In some embodiments, the markings or units of measurement are successively arranged in degrees.

Figure 4:
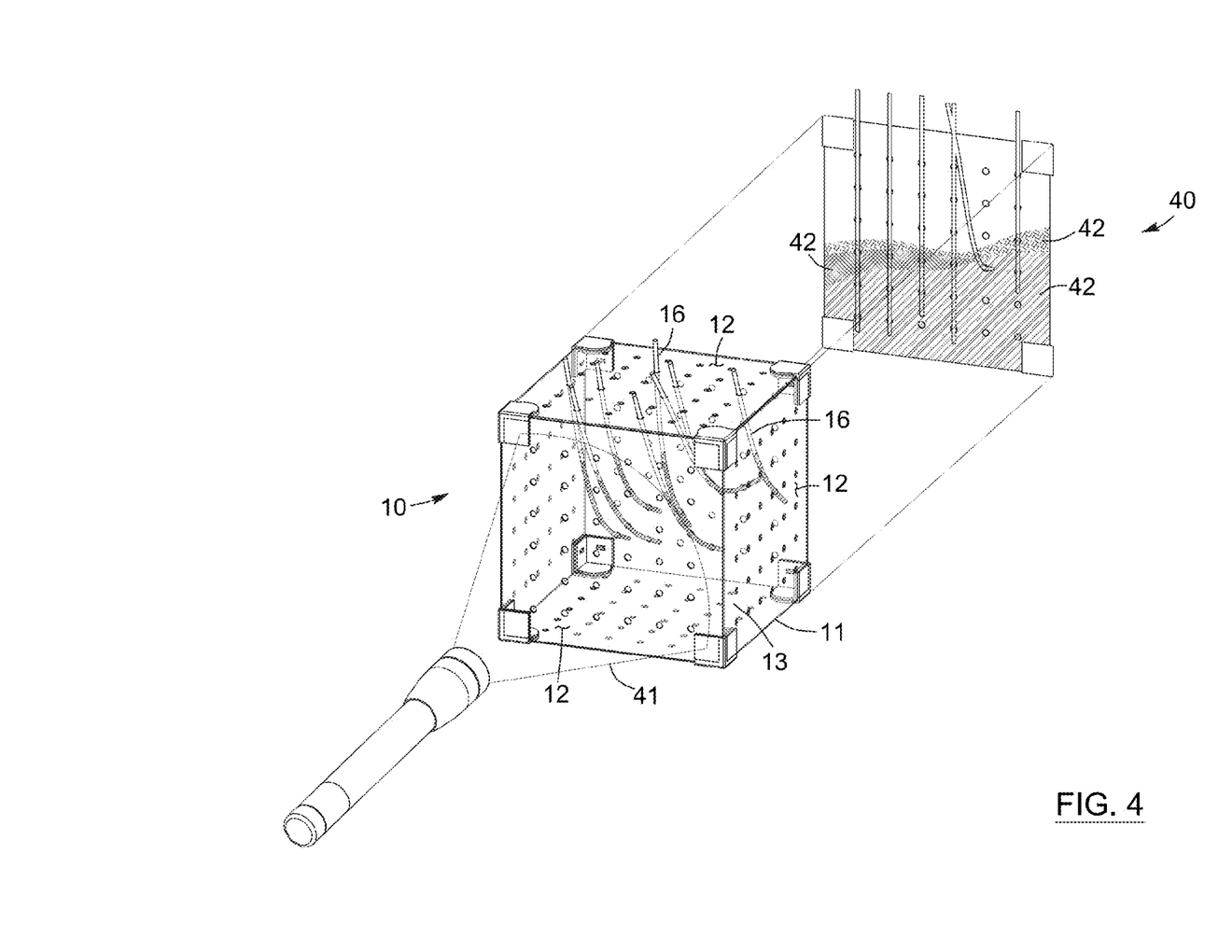
FIG. 4 is a perspective view of the system for bidimensional extrapolation of an exploration network according to an embodiment of the present invention.

Referring to FIG. 4, a system is shown for bidimensional extrapolation (40) of an exploration network. The system includes a tridimensional modeling apparatus (10) for representing an exploration network that includes a transparent hollow cube (11). The cube (11) includes six plane surfaces (12) for representing an enclosed volume (13). The cube (11) also includes a plurality of perforations on at least two of the six plane surfaces (12) and indicia around each opening for marking polar coordinates and orientation. The tridimensional modeling apparatus (10) also includes a plurality of transparent rods (16) for representing exploration channels and each rod (16) having a length of at least that of the diagonal of the plane surface (11). The perforations are equidistant and are aligned parallel to each other. Each rod (16) is colored with a marker for a visual representation of various strata of observation channels. Each rod (16) is inserted into an opening with an angle and a depth corresponding to an angle and a depth of the exploration channels, the resulting apparatus (10) with the inserted rods (16) providing a visual representation of the exploration network within the represented volume (13). The system further includes a light source (41) directed at an angle onto the tridimensional modeling apparatus (10) for projecting onto an opaque surface a bidimensional extrapolation (40) of the exploration network.

According to another optional aspect of the system, the observation channels represent subsurface exploration wells.

According to another optional aspect of the system, the various strata of observation channels represent subsurface deposit layers or lithology (42).

Figure 5A:
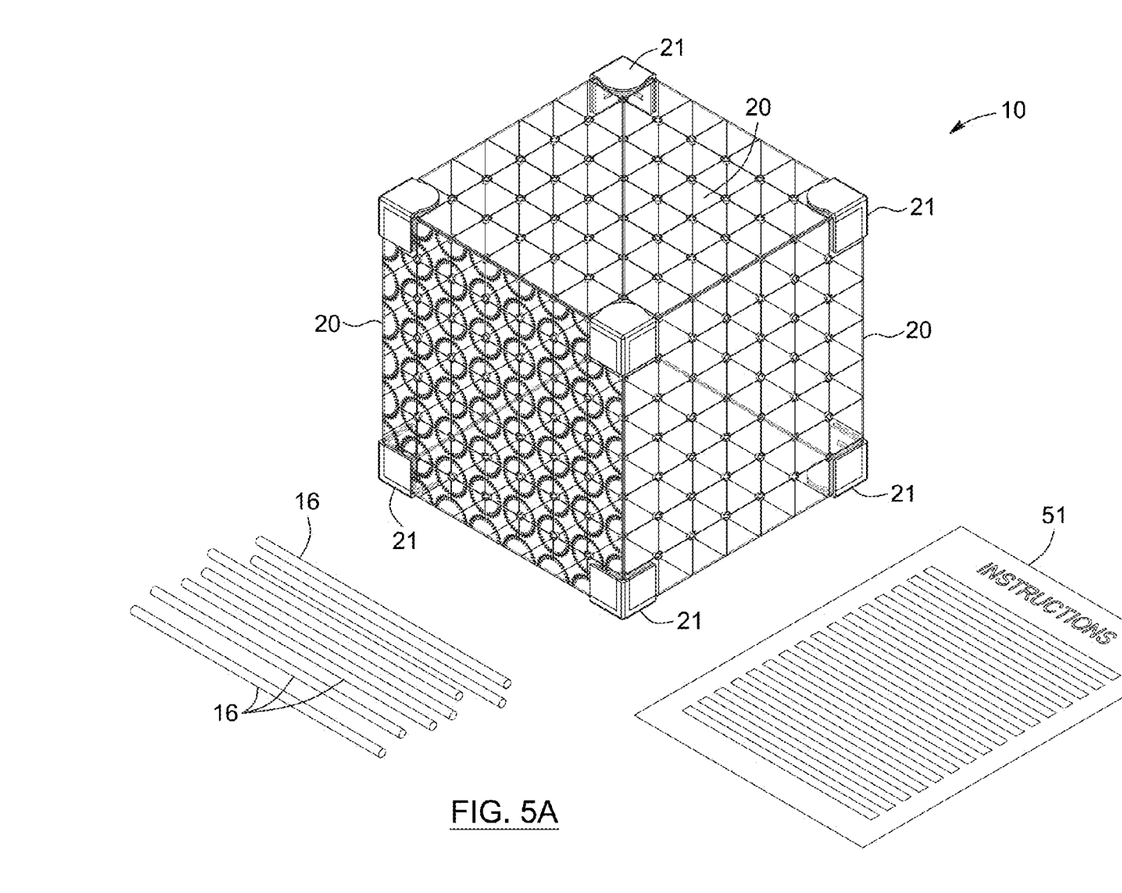
FIG. 5A is a perspective view of the tridimensional modeling kit for representing an exploration network according to an embodiment of the present invention.
Figure 5B:
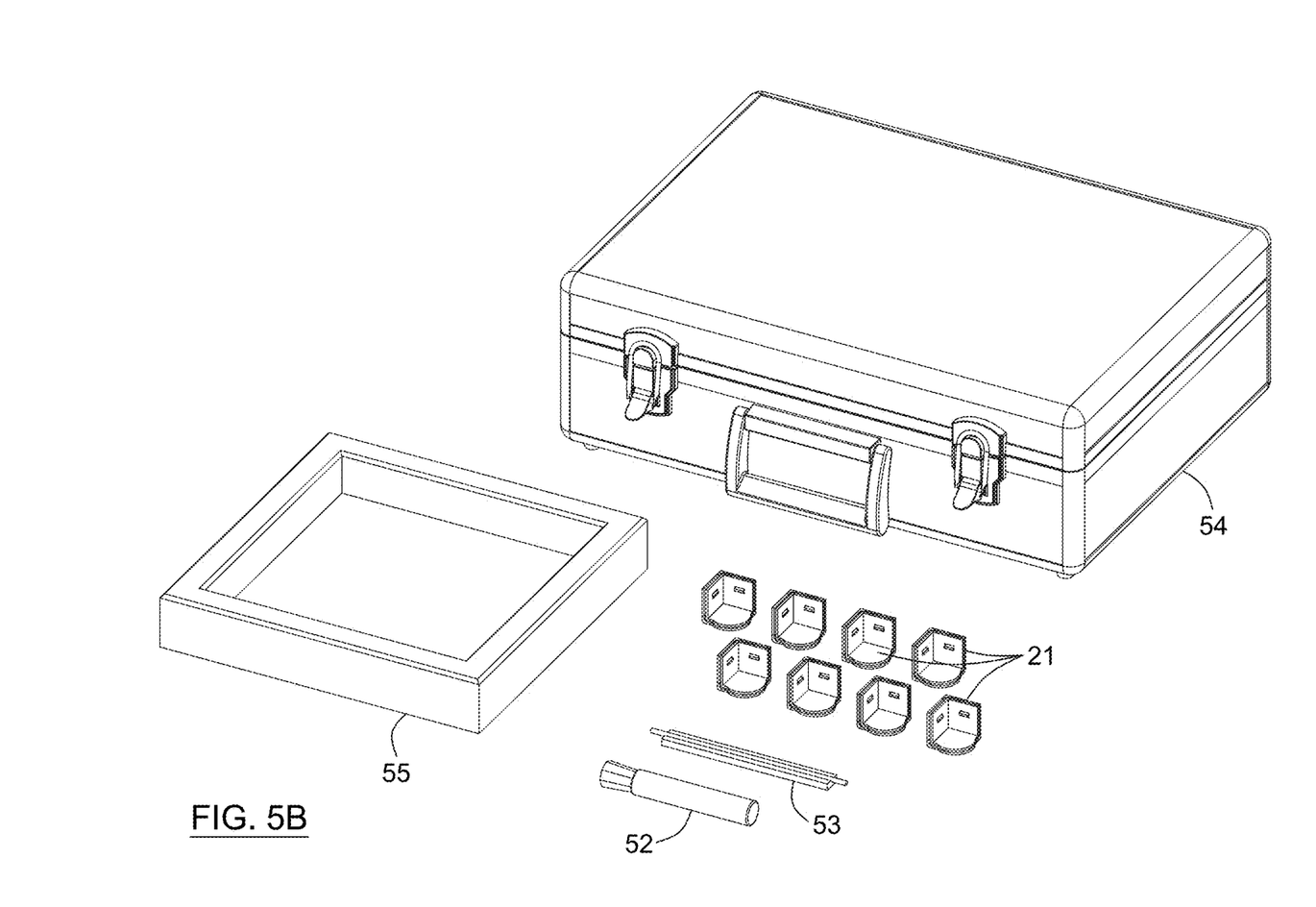
FIG. 5B is a perspective view of optional features of the tridimensional modeling kit according to an embodiment of the present invention.
Figure 6A:
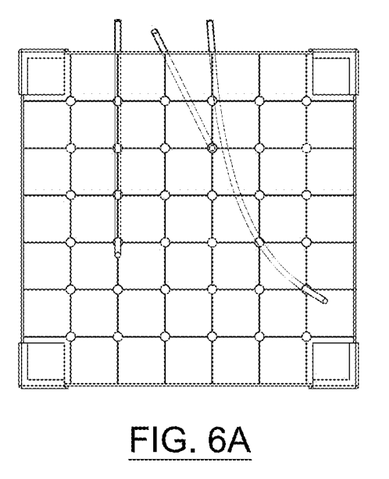
FIG. 6A is a top view of the tridimensional apparatus with inserted rods according to an embodiment of the present invention.
Figure 6B:
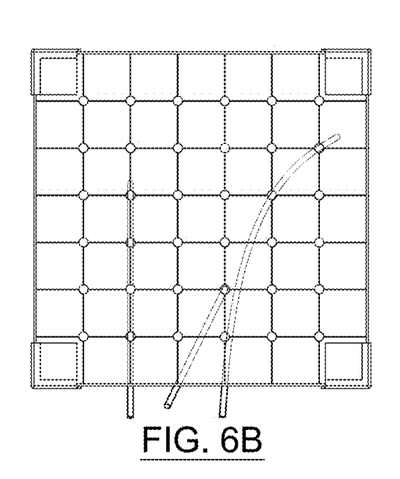
FIG. 6B is a bottom view of the tridimensional apparatus with inserted rods according to an embodiment of the present invention.
Figure 6C:
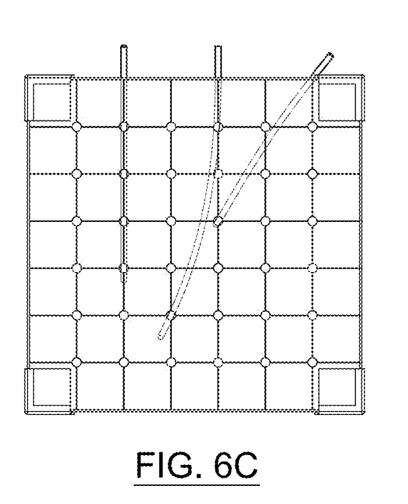
FIG. 6C to 6F are side views of the tridimensional apparatus view with inserted rods according to an embodiment of the present invention.
Figure 6D:
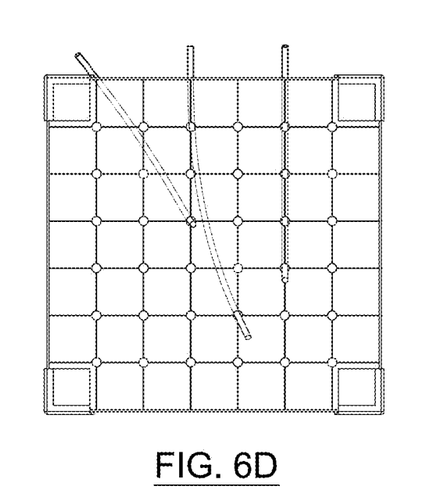
Figure 6E:
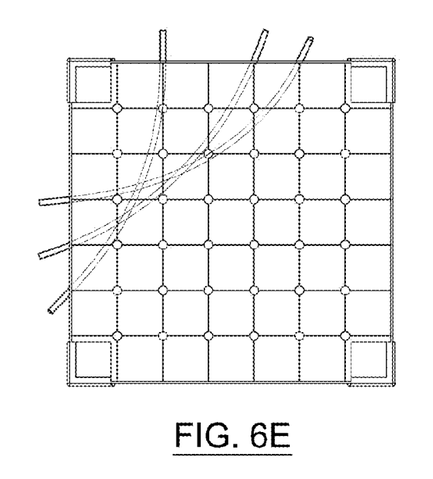
Figure 6F:
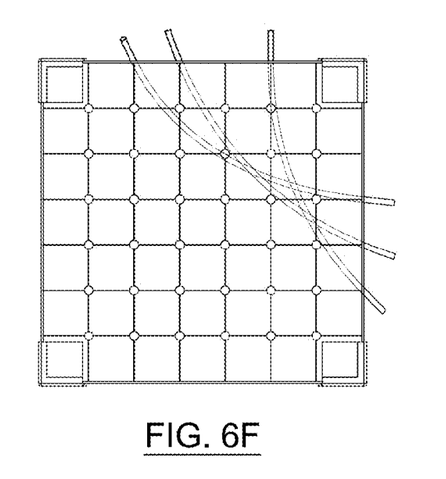

Referring to FIGS. 5A and 5B, a tridimensional modeling kit is shown for representing an exploration network. The kit includes a plurality of plane mountable surfaces (20) for assembling a transparent hollow cube for representing an enclosed volume. The plane mountable surfaces (20) include a plurality of perforations on at least two of the plane mountable surfaces (20) and indicia around each opening for marking polar coordinates and orientation. The kit also includes a plurality of transparent rods (16) for representing exploration channels and each rod (16) having a length of at least that of the diagonal of the plane surface. The kit also includes instructions (51) for assembling the cube and for creating a tridimensional model (10) of the exploration network.

According to another optional aspect of the present invention, the kit includes a marker (52) for drawing patterns on the rods for representing various strata of observations channels.

According to another optional aspect of the present invention, the kit includes a rod marking tray (53) for supporting and facilitating the marking of the rods (16).

According to another optional aspect of the present invention, the kit includes a carrycase (54) for transporting and protecting the plane mountable surfaces (20) and the plurality of rods (16).

According to another optional aspect of the present invention, the kit includes a docking station (55) for immobilizing the tridimensional model of the exploration network.

According to another optional aspect of the present invention, the kit includes corner fasteners (21) for mounting and demounting of the cube.

While embodiments of the present invention have been illustrated in the accompanying drawings and described in detail above, it is to be understood that the invention is not limited to these precise embodiments and that various changes and modifications may be effected therein without departing from the scope or spirit of the present invention.

The invention claimed is:

1. A tridimensional modeling apparatus for providing a representation of an exploration network, the modeling apparatus comprising:
a transparent hollow cube comprising:
six plane surfaces for representing an enclosed volume;
a plurality of perforations on at least two of the six plane surfaces; and
indicia around each perforation for marking polar coordinates and orientation;
a plurality of transparent rods for representing exploration channels and each rod having a length of at least that of the diagonal of the plane surface; and
wherein the plurality of perforations are equidistant and are aligned parallel to each other for angularly receiving the plurality of rods for tridimensional modeling of the exploration network; and
wherein each rod is inserted into an opening with an angle and a depth corresponding to an angle and a depth of the exploration channel, the resulting apparatus with the inserted rods providing a visual representation of the exploration network within the represented volume.

2. The modeling apparatus of claim 1, wherein the surfaces and the rods are of a thermoplastic material.

3. The modeling apparatus of claim 2, wherein the thermoplastic material comprises polymethyl methacrylate.

4. The modeling apparatus of claim 1, wherein the perforations are of a circular shape.

5. The modeling apparatus of claim 1, wherein the rods are cylindrical.

6. The modeling apparatus of claim 1, wherein the rods are flexible.

7. The modeling apparatus of claim 1, wherein each rod is capable of being colored with a marker for drawing patterns on the rod for representation of various strata of observation channels.

8. The modeling apparatus of claim 7, wherein the marker is erasable.

9. The modeling apparatus of claim 1, wherein the surfaces are demountable.

10. The modeling apparatus of claim 1, further comprising corner fasteners for mounting and demounting of the cube and for connecting a plurality of tridimensional modeling apparatuses together.

11. The modeling apparatus of claim 1, wherein the indicia are markings with divisions or units of measurement.

12. The modeling apparatus of claim 11, wherein the markings or units of measurement are successively arranged in degrees.

13. A system for bidimensional extrapolation of an exploration network comprising:
a tridimensional modeling apparatus for representing an exploration network, the modeling apparatus comprising:
a transparent hollow cube comprising:
six plane surfaces for representing an enclosed volume;
a plurality of perforations on at least two of the six plane surfaces;
indicia around each opening for marking polar coordinates and orientation;
a plurality of transparent rods for representing exploration channels and having a length of at least that of the diagonal of the plane surface;
wherein the plurality of perforations are equidistant and are aligned parallel to each other;
wherein each rod is colored with a marker for a visual representation of various strata of observation channels; and
wherein each rod is inserted into an opening with an angle and a depth corresponding to an angle and a depth of the exploration channels, the resulting apparatus with the inserted rods providing a visual representation of the exploration network within the represented volume; and further comprising
a light source directed at an angle onto the tridimensional modeling apparatus for projecting onto an opaque surface a bidimensional extrapolation of the exploration network.

14. The system of claim 13, wherein the observation channels represent subsurface exploration wells.

15. The system of claim 14, wherein the various strata of observation channels represent subsurface deposit layers or lithology.

16. A tridimensional modeling kit for representing an exploration network comprising:
- a plurality of plane mountable surfaces for assembling a transparent hollow cube for representing an enclosed volume, the surfaces comprising:
  - a plurality of perforations on at least two of the plane mountable surfaces;
  - indicia around each opening for marking polar coordinates and orientation;
- a plurality of transparent rods for representing exploration channels and each rod having a length of at least that of the diagonal of the plane mountable surface; and
- instructions for assembling the cube and for creating a tridimensional model of the exploration network.

17. The kit of claim 16, further comprising a marker for drawing patterns on the rods for representing various strata of observations channels.

18. The kit of claim 16, further comprising a rod marking tray for supporting and facilitating the marking of the rods.

19. The kit of claim 16, further comprising a carrycase for transporting and protecting the plane mountable surfaces and the plurality of rods.

20. The kit of claim 16, further comprising a docking station for immobilizing the tridimensional model of the exploration network.

21. The kit of claim 16, further comprising corner fasteners for mounting and demounting of the cube.

\* \* \* \* \*